United States Patent [19]

Page

[11] Patent Number: 5,376,246
[45] Date of Patent: Dec. 27, 1994

[54] EFFICIENT MASS-SELECTIVE THREE-PHOTON IONIZATION OF ZIRCONIUM ATOMS

[75] Inventor: Ralph H. Page, San Ramon, Calif.

[73] Assignee: The United States of America as represented by the United States Department of Energy, Washington, D.C.

[21] Appl. No.: 984,170

[22] Filed: Dec. 2, 1992

[51] Int. Cl.$^5$ ............................................. B01D 5/00
[52] U.S. Cl. ............................................. 204/157.22
[58] Field of Search ............. 204/157.22; 423/DIG. 7

[56] References Cited

U.S. PATENT DOCUMENTS

| | | | |
|---|---|---|---|
| 4,568,436 | 2/1986 | Feichtner et al. | 204/157.22 |
| 4,793,907 | 12/1988 | Paisner et al. | 204/157.22 |
| 5,202,005 | 4/1993 | Paisner et al. | 204/157.22 |
| 5,316,635 | 5/1994 | Green et al. | 204/157.22 |

OTHER PUBLICATIONS

P. A. Hackett, et al., "The first ionization potential of zirconium atoms determined by two-laser field-ionization spectroscopy of high lying Rydberg series," J. Chem. Phys., vol. 85, No. 6, 15 Sep. 1986, pp. 3194-3197.

P. A. Hackett, et al., "Pulsed single-mode laser ionization of hyperfine levels of zirconium-91," J. Opt. Soc. Am. B., vol. 5, No. 12, Dec. 1988, pp. 2409-2416.

Richard W. Solarz, "A Physics Overlook of AVLIS," Publication No. UCID-20343, Lawrence Livermore National Laboratory, Feb. 1985.

L. R. Carlson, et al., "Radiative lifetimes, absorption cross sections, and the observation of new high-lying odd levels of $^{238}$U using multistep laser photoionization," J. Opt. Soc. Am., vol. 66, No. 8, Aug. 1976, pp. 846-853.

Primary Examiner—Ngoclan T. Mai
Attorney, Agent, or Firm—Miguel A. Valdes; Roger S. Gaither; William R. Moser

[57] ABSTRACT

In an AVLIS process, $^{91}$Zr is selectively removed from natural zirconium by a three-step photoionization wherein Zr atoms are irradiated by a laser beam having a wavelength $\lambda_1$, selectively raising $^{91}$Zr atoms to an odd-parity $E_1$ energy level in the range of 16000-19000 cm$^{-1}$, are irradiated by a laser beam having a wavelength $\lambda_2$ to raise the atoms from an $E_I$ level to an even-parity $E_2$ energy level in the range of 35000-37000 cm$^{-1}$ and are irradiated by a laser beam having a wavelength $\lambda_3$ to cause a resonant transition of atoms from an $E_2$ level to an autoionizing level above 53506 cm$^{-1}$. $\lambda_3$ wavelengths of 5607, 6511 or 5756 Å will excite a zirconium atom from an $E_2$ energy state of 36344 cm$^{-1}$ to an autoionizing level; a $\lambda_3$ wavelength of 5666 Å will cause an autoionizing transition from an $E_2$ level of 36068 cm$^{-1}$; and a $\lambda_3$ wavelength of 5662 Å will cause an ionizing resonance of an atom at an $E_2$ level of 35904 cm$^{-1}$.

9 Claims, 2 Drawing Sheets

EFFICIENT MASS-SELECTIVE THREE-PHOTON IONIZATION OF ZIRCONIUM ATOMS

STATEMENT OF GOVERNMENTAL RIGHTS

The U.S. Government has rights to this invention pursuant to Contract No. W-7405-ENG-48 between the United States Department of Energy and the University of California.

BACKGROUND OF THE INVENTION

This invention relates to a method for selectively removing the mass-91 isotope of zirconium ($^{91}$Zr) from natural zirconium, and more particularly to a method of selectively ionizing $^{91}$Zr atoms for removal by a charged collector.

Zirconium metal is vital to the nuclear power industry because of its low cross section for thermal neutron absorption. This property, combined with its toughness and corrosion resistance, makes zirconium almost ideal for nuclear reactor core components, such as pressure tubes and calandria, and for the cladding of nuclear fuel bundles. However, reactor operation could be improved if the thermal neutron absorption cross-section of zirconium in reactor components were reduced further. For example, the thickness of pressure tubes could be increased to extend their service lifetimes without increasing, and perhaps decreasing, their neutron absorption. It has been recognized for many years that depleting or removing entirely one of the isotopes or zirconium would reduce its neutron cross section. Zirconium has five isotopes, of atomic mass 90, 91, 92, 94, and 96. The mass-91 isotope has a natural abundance of just above 11%, but it accounts for 75% of the thermal neutron absorption cross section in natural zirconium. By reducing the concentration of $^{91}$Zr to 3%, the neutron cross section of the denatured zirconium would be less than half that of the natural metal.

Mass 91 is an "interior" isotope and thus cannot easily be stripped with ordinary techniques (e.g., diffusion). However, a method that has been developed to separate metal isotopes is the atomic vapor laser isotope separation (AVLIS) process wherein a beam of neutral metal atoms is irradiated by tunable lasers to ionize atoms of a desired isotope of the metal. The ionized atoms are attracted to an electrically charged extractor while the beam of neutral atoms continues unimpeded in its flow until it condenses on a collector plate.

Hackett et al., "The first ionization potential of zirconium atoms determined by two-laser fieldionization spectroscopy of high lying Rydberg series," *J. Chem. Phys.*, Vol. 85, No. 6, Sep. 15, 1986, pp. 3194–3197, describes the determination of an accurate value for the first ionization potential (I.P.) of zirconium to be 53 506.0(3) cm$^{-1}$. In a later publication by Hackett et al., "Pulsed single-mode laser ionization of hyperfine levels of zirconium-91," *J. Opt. Soc. Am.* B., Vol. 5, No. 12, December 1988, pp. 2409–2416, two-color mass-selective ionization of $^{91}$Zr in an atomic beam was demonstrated. Isotopic selectivity was obtained on the first of the three absorption transitions ($\lambda_1$) leading to odd-parity energy levels ($E_1$) in the 16000–19000 cm$^{-1}$ range. They proposed that with proper choices of these $\lambda_1$ transitions (between known energy levels of zirconium), an AVLIS process could be developed. By doing spectroscopic searches, some resonances were found for the $\lambda_2$ transitions, and even-parity energy levels ($E_2$) in the 35000–37000 cm$^{-1}$ range were cataloged. Some ionization was caused by the non-resonant absorption at the $E_2$ energy level of another photon at wavelength $\lambda_2$, bringing the total absorbed photon energy above the ionization potential (IP) of 53506 cm$^{-1}$.

Although Hackett et al. (1988) demonstrated on a microscopic scale that it would be possible to separate $^{91}$Zr by an AVLIS process, this publication does not disclose how such a process could be used with sufficient efficiency that a commercial operation could be carried out. The weakest step in a photoionization sequence is generally the addition of photon energy to ionize atoms from an $E_2$ energy level. With respect to this step, Hackett et al. 1988 recognize that if a $^{91}$Zr atom is at a particular $E_2$ energy level, for example at an energy level of 36068 cm$^{-1}$, that the wavelength of a further absorbed photon must be $\leq 573.5$ nm in order to ionize the atom. The 573.5 nm wavelength is, of course, deduced by subtracting the $E_2$ energy level of 36068 cm$^{-1}$ from the ionization potential of 53506 cm$^{-1}$, and then taking the reciprocal thereof. The wavelengths used by Hackett et al. 1988 for the $\lambda_2$ transitions are short enough so that they will cause some ionization, but with very low efficiency. The Hackett et al. 1988 publication does not disclose how ionization of $^{91}$Zr atoms can be accomplished efficiently, with resonant excitation by a photon of a $\lambda_3$ wavelength, causing a transition from a $E_2$ energy level to an autoionizing level.

Also, the radiative lifetime of $^{91}$Zr atoms at $E_2$ energy levels and the $\lambda_3$ transition cross sections are not addressed by Hackett et al. 1988. These parameters govern the laser requirements needed to produce ionization and thus impact the economic feasibility of an AVLIS process for the selective removal of $^{91}$Zr atoms.

SUMMARY OF THE INVENTION

It is the principal object of the invention to increase the efficiency of ionization of $^{91}$Zr atoms by using a laser tuned to a $\lambda_3$ wavelength corresponding to a resonance of the atoms at an $E_2$ energy level, causing a $\lambda_3$ transition to an autoionizing level above the ionization potential.

Additional objects, advantages and novel features will be set forth in the description which follows, and in part will become apparent to those skilled in the art upon examination of the following, or may be learned from practice of the invention. The objects and advantages of the invention may be realized and attained by means of the instrumentalities and combinations pointed out in the appended claims.

To achieve the foregoing and other objects, and in accordance with the present invention, as described and broadly claimed herein, a method of selectively ionizing $^{91}$Zr atoms is provided wherein the atoms are irradiated with a laser beam having a wavelength $\lambda_1$ that causes a resonant transition from a low-lying energy state to an odd-parity $E_1$ energy level in the 16000–19000 cm$^{-1}$ range, wherein the atoms are irradiated with a laser beam having a wavelength that causes a resonant transition of the atoms from an $E_1$ energy level to an even-parity $E_2$ energy level, and wherein the atoms are irradiated with a laser beam having a wavelength $\lambda_3$ that causes a resonant transition of the atoms from an $E_2$ energy level to an autoionizing level above 53506 cm$^{-1}$.

BRIEF DESCRIPTION OF THE DRAWINGS

The accompanying drawings, which are incorporated in and form part of the application, together with the description, serve to explain the principles of the invention.

DESCRIPTION OF THE PREFERRED EMBODIMENT

Figure 1:
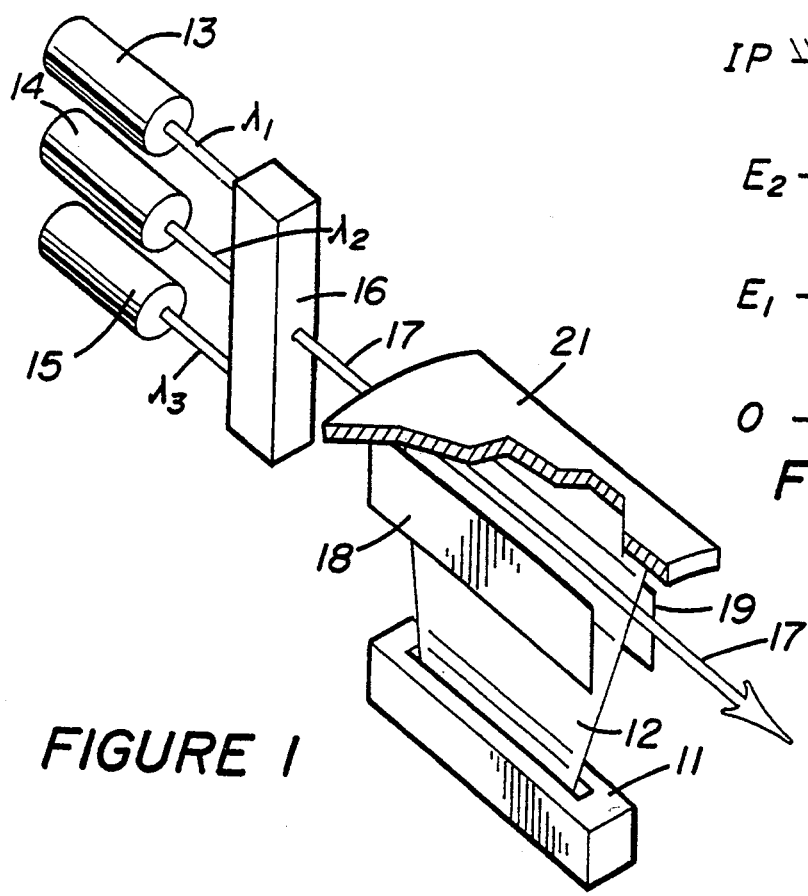
FIG. 1 is a simplified illustration of the principal component of an AVLIS process.

Referring now to the drawings, wherein preferred embodiments of the invention are shown, and In particular to FIG. 1, wherein the principal components of an AVLIS process using a three-photon stepwise photoionization method are illustrated, the metal to be processed is normally contained in a crucible 11 and is heated from above by an electron beam (not shown) to a temperature sufficient to generate a substantial vapor pressure of the material from the surface of the electron-beam-heated melt.

The gas-phase atoms are initially in thermal equilibrium with the surface and the internal temperature of the atoms is often several thousands of degrees. At these temperatures, only a small fraction of the atoms have no electronic excitation. By the process of atom-atom collisions, the energy initially contained in the electronic degree of freedom is transferred to the translational degrees of freedom, resulting in a cooling of the internal temperature of the atoms and simultaneously resulting in a highly directed flow of the material in a stream 12. This process is quite similar to the relaxation process that takes place in nozzled beams. An important result is that even refractory materials, such as zirconium, can be configured to deliver low internal temperature atomic vapor.

For a three-photon stepwise ionization AVLIS process, three lasers, 13, 14, and 15, generate beams of wavelengths $\lambda_1$, $\lambda_2$, and $\lambda_3$, respectively, these beams being combined in combinet 16 to produce a beam 17 that irradiates the stream of atoms 12 with light of the three frequencies. For commercial operation, the lasers 13, 14 and 15 are preferably tunable dye lasers pumped by copper-vapor lasers.

Figure 2:
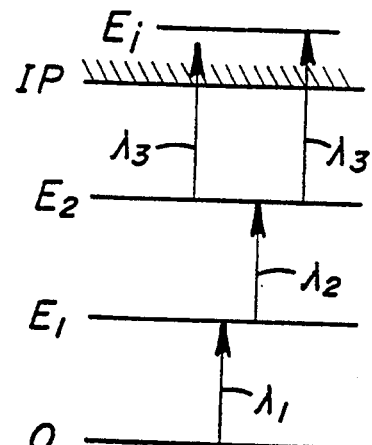
FIG. 2 illustrates a basic three-step selective laser photoionization technique for producing ionization in an AVLIS process.

With most of the atoms in stream 12 being in the lowest-lying electronic states (the "0" ground state of FIG. 2), light of a single wavelength $\lambda_1$ can be used to selectively excite the isotope of interest and cause a resonant photon-absorption transition to an odd-parity energy level $E_1$. By irradiating atoms in the energy level $E_l$ with light of a suitable wavelength $\lambda_2$, a resonant photon-absorption will raise the atoms to a higher even-parity energy level $E_2$.

Absorption of energy of a sufficiently short wavelength $\lambda_3$ will increase the energy of atoms in an $E_2$ energy level to a level above the ionization potential (IP) and ionization will occur. If the wavelength $\lambda_3$ of the absorbed light is such that the absorption is nonresonant (as indicated by the left-hand $\lambda_3$ transition in FIG. 2), the efficiency of ionization will be relatively small. However, If the wavelength $\lambda_3$ is of a value that will cause resonant-absorption, with a transition to an autoionizing level $E_i$, the efficiency will be greatly enhanced.

The stream of atoms 12 passes between extraction plates 18 and 19, electrically charged with opposite potentials, and the positively charged ions are attracted to the negatively charged extractor plate while the remainder of the stream continues unimpeded in its flow until it contacts and condenses upon a collector structure 21 placed directly above the crucible 11. The ions attracted to the extractor plate and the remainder of the metal condensed on the collector structure are then removed by a suitable batch or continuous process.

Figure 3:
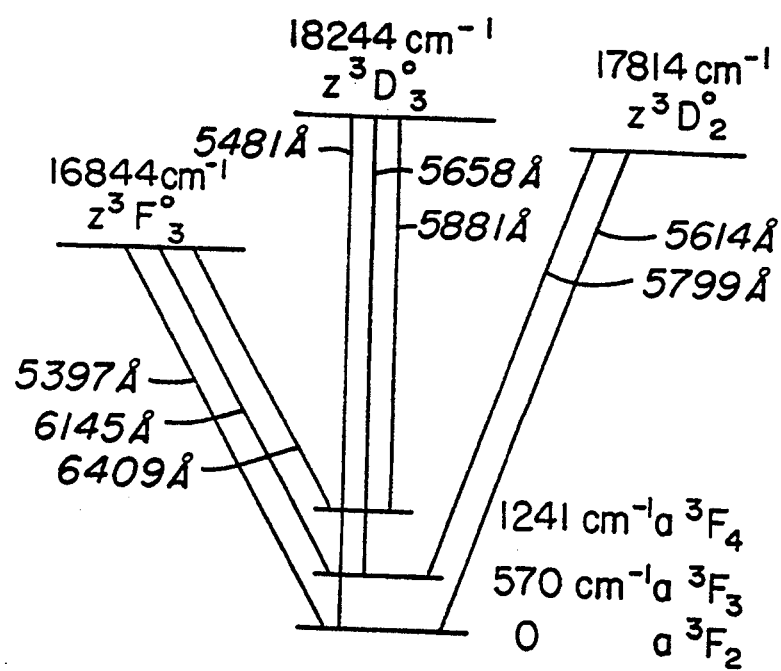
FIG. 3 illustrates the $\lambda_1$ transitions of $^{91}Zr$ that provide for selective excitation of mass-91.

FIG. 3 illustrates the odd-parity energy levels $E_1$ and the wavelengths of visible light that can cause resonant transitions from the 0 ground state and the low-lying metastable states (570 and 1241 cm$^1$) of Zr. These transitions are known to provide isotope selectivity of $^{91}Zr$, terminate at energy levels with lifetimes of a few hundred nanoseconds (nsec), and are eminently suited for stepwise ionization with ~50 nsec copper vapor laser system pulses. The three largest oscillator strengths (at 6145, 5881 and 5799 Å) are in the range of 0.001–0.01. The approximate validity of the LS-coupling description of low-lying levels of Zr implies that some transitions (e.g., 0–18244 cm$^{-1}$) are especially weak because they violate the $\Delta J = \Delta L$ propensity rule.

In the present invention, three independently tunable lasers were used to provide excitation of $^{91}Zr$ atoms at wavelengths $\lambda_1$, $\lambda_2$ and $\lambda_3$, with the time separation between the $\lambda_2$, and $\lambda_3$ pulses being variable. Also, with variable attenuation, the intensities of the beams were also adjustable. With $\lambda_1$ and $\lambda_2$ set to pump an $E_2$ level, $\lambda_3$ was scanned to find a strong autoionizing resonance or resonances that gave a steady ion signal. Then, by adjusting the $\lambda_3$ pulse's delay and fluence and noting the signal variations, the lifetimes could be derived and the ionization cross sections of the $E_2$ levels could be estimated.

Laser pulsewidths were about 5 nsec, fluences were typically 0.1 to 10 mj/cm$^2$, and linewidths were about 0.3 cm$^{-1}$. Optogalvanic wavelength calibration with Ne lines gave energy level positions accurate to within 1 cm$^{-1}$.

Figure 4:
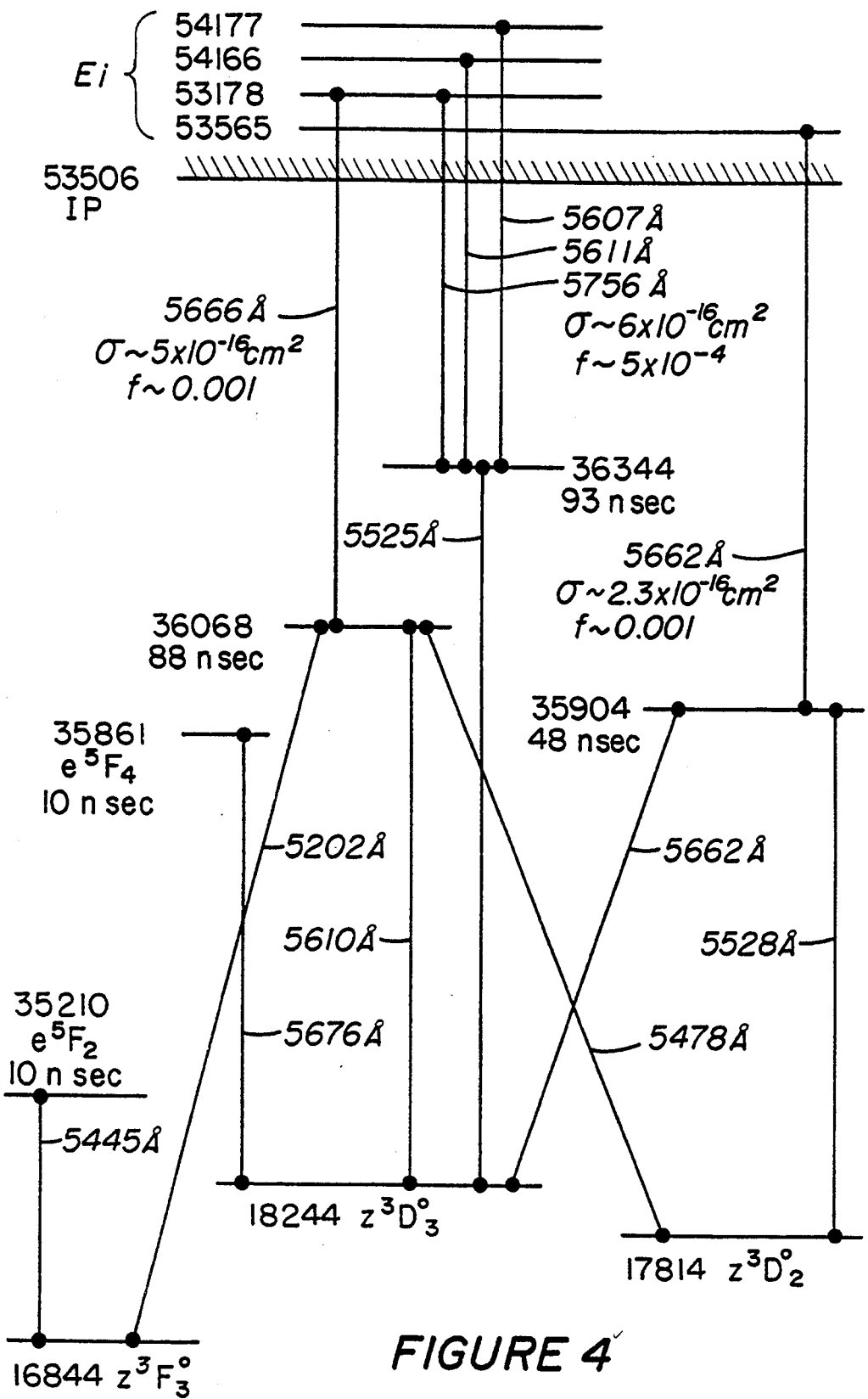
FIG. 4 illustrates the highest cross sectional ionization pathways for Zr and shows $E_2$ levels and lifetimes, $\lambda_2$ wavelengths, and strongest $\lambda_3$ transition wavelengths and cross sections.

FIG. 4 summarizes the results, for resonance ionization purposes, of the $\lambda_2$ and $\lambda_3$ scans, for the highest-cross-section ionization pathways to autoionizing levels $E_i$ for the 35904, 36068 and 36344 cm$^{-1}E_2$ energy levels. These levels are accessible from the 16844, 17814 and 18244 cm$^{-1}$ $E_1$ levels (FIG. 3) that provide selective excitation of $^{91}Zr$. The transition wavelengths are shown in angstroms (Å). FIG. 4 also shows the $E_2$ levels and lifetimes, the strongest $\lambda_3$ transitions and cross sections ($\sigma$, in cm$^2$), and oscillator strengths (f).

The $E_2$ energy levels at 35210, 36068 and 35904 cm$^{-1}$ agree with those previously found by Hackett et al. 1988. In addition, $E_2$ energy levels at 35860 and 36344 cm$^{-1}$ were found. The 35210 and 35860 cm$^{-1}$ levels both have a 10 nsec lifetime. The other three $E_2$ levels, 35904, 36068 and 36344 cm$^{-1}$ have lifetimes ranging from 48 to 92 nsec, which enhances the ionization efficiency when laser pulses of several tens-of-nsec are used. Saturation broadening of the 5525 Å 18244–36344 transition was observed, and its oscillator strength is believed to exceed 0.001.

FIG. 4 includes vacuum wavelengths of the strongest ionizing transitions for each $E_2$ level. For the longer-lived levels, an ionizing cross section (saturation fluence) was deduced from the "knee" location in a plotted curve of ion signal rs. fluence. Lifetimes not much longer than the laser pulse give gentler saturation curves, hindering the measurement. In particular, the 35210 cm$^{-1}$ level's $\lambda_3$ spectrum (which was short because of limited laser tunability) did not include any easily-saturated autoionizing transition. The strongest signals observed in all spectra were due to lines noticeably broader than the laser linewidth, and the integrated cross sections imply oscillator strengths around 0.001.

The efficiency of ionization shows a dramatic (over one order of magnitude) increase when $\lambda_3$ is tuned to a resonance and the energy of the atom is increased to an autoionizing level.

It will be noted that the 5662 Å wavelength used for the 18244–35904 cm$^{-1}$ $\lambda_2$ transition is the same as the $\lambda_3$ wavelength that will cause resonant absorption from the 35904 cm$^{-1}$ level and autoionization. As a consequence, a Zr ionization process can be designed wherein the lasers producing light at the $\lambda_2$ and $\lambda_3$ wavelengths could be a single laser with a single wavelength causing both these transitions. However, the ionization efficiency of such a system would not be as high as the ionization from the $E_2$ energy level reached by an 18244–36344 cm$^{-1}$ $\lambda_2$ transition.

The foregoing description of the preferred embodiments have been presented for purposes illustration and description. It is not intended to be exhaustive or to limit the invention to the precise wavelengths described, and obviously many other modifications are possible in light of the above teaching. The embodiments were chosen in order to explain most clearly the principles of the invention and its practical applications thereby to enable others in the art to utilize most effectively the invention in various other embodiments and with various other modifications as may be suited to the particular use contemplated. It is intended that the scope of the invention be defined by the claims appended hereto.

I claim:

1. A method of selectively ionizing and extracting zirconium atoms of isotope 91 ($^{91}$Zr) from a stream of zirconium atoms that includes $^{91}$Zr and other zirconium isotopes, comprising the steps of:
    a) irradiating the stream of zirconium atoms with a first laser beam having a wavelength $\lambda_1$ that causes a resonant transition of $^{91}$Zr atoms from a stable state energy level to an odd-parity $E_1$ energy level;
    b) irradiating the stream of zirconium atoms with a second laser beam having a wavelength $\lambda_2$ that causes a resonant transition of $^{91}$Zr atoms from an $E_1$ energy level to an even-parity $E_2$ energy level; and
    c) irradiating the stream of zirconium atoms with a third laser beam having a wavelength $\lambda_3$ that causes a resonant transition of $^{91}$Zr atoms from an $E_2$ energy level to an autoionizing level above 53506 cm$^{-1}$.

2. The method as set forth in claim 1, wherein the energy level $E_2$ in steps (b) and (c) is 36344 cm$^{-1}$.

3. The method as set forth in claim 2, wherein the wavelength $\lambda_3$ in step (c) is 5607 Å.

4. The method as set forth in claim 2, wherein the wavelength $\lambda_3$ in step (c) is 5611 Å.

5. The method as set forth in claim 2, wherein the wavelength $\lambda_3$ in step (c) is 5756 Å.

6. The method as set forth in claim 1, wherein the energy level $E_2$ in steps (b) and (c) is 36068 cm$^{-1}$, and the wavelength $\lambda_3$ in step (c) is 5666 Å.

7. The method as set forth in claim 1, wherein the energy level $E_2$ in steps (b) and (c) is 35904 cm$^{-1}$, and the wavelength $\lambda_3$ in step (c) is 5662 A.

8. The method as set forth in claim 7, wherein the energy level $E_1$ in steps (a) and (b) is 18244 cm$^{-1}$, and the wavelength $\lambda_2$ in step (b) is the same as that of the wavelength $\lambda_3$ in step (c).

9. The method as set forth in claim 1, wherein said steps of irradiating with laser beams having wavelengths $\lambda_1$, $\lambda_2$, $\lambda_3$, include using three independently tunable lasers to provide excitation of $^{91}$Zr atoms at said wavelengths $\lambda_1$, $\lambda_2$, $\lambda_3$.

* * * * *